Figures 1, 2:
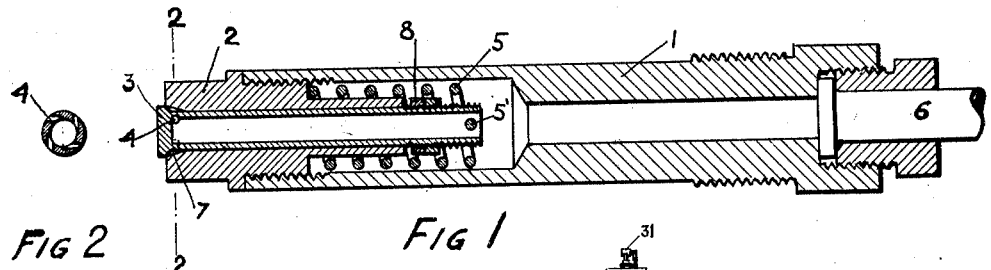

Dec. 10, 1929.  L. WYGODSKY  1,739,024
METHOD AND MEANS FOR LUBRICATING CYLINDERS OF RECIPROCATING
ENGINES, COMPRESSORS, PUMPS, ETC
Filed July 26, 1924

INVENTOR.
Leon Wygodsky
BY
William W. Varney
ATTORNEY.

Patented Dec. 10, 1929

1,739,024

UNITED STATES PATENT OFFICE

LEON WYGODSKY, OF BALTIMORE, MARYLAND

METHOD AND MEANS FOR LUBRICATING CYLINDERS OF RECIPROCATING ENGINES, COMPRESSORS, PUMPS, ETC.

Application filed July 26, 1924. Serial No. 728,403.

The object of this invention is to do away with the present inefficient methods of lubrication of cylinders, and also to make the lubrication efficient and more reliable.

The present methods of lubricating cylinders may be divided into the following classes:

Lubrication by periodically forcing one or more drops of oil through one or more plugs or points on the surface of the cylinder. In this method, the oil applied in one or more points has to spread over the surface of the cylinder. Naturally, the oil has a long way to travel and to facilitate the spreading of the oil, a larger quantity has to be supplied than is necessary. It is evident that the lubrication cannot be even.

Lubrication by means of periodically discharging one or more drops of oil into the gas or vapor in the intake pipe of the cylinder. This is very often used in steam cylinders. The action of the steam has a pulverizing effect on the oil and the same appears inside of the cylinder in the shape of a fog which is deposited on all the surfaces with which it comes in contact. It is easily seen that only a fraction of the available oil in the fog will be deposited. The major part of the oil is ejected through the exhaust. This method, besides being insufficient, is also wasteful and unreliable. It is also impossible to lubricate a dry cylinder before starting the engine. This is responsible for many failures of engine cylinders. To this class also belongs the method of mixing lubricant with gasoline as sometimes used in small two cycle engines.

The so-called "splash" lubrication. This is applicable mostly to vertical cylinders with an enclosed crank case. The objection to this system is that the cylinder is often over-lubricated; although economical in oil consuption, it is objectionable on account of the fact, that the oil soon deteriorates because of sediments, water, or dilution as in case of condensed gasoline passing through the piston rings.

The subject of this invention is a new method and means for doing away with all the objections enumerated above.

The method consists in periodically discharging the lubricant through a nozzle situated preferably in the cylinder cover or head, in the shape of a hollow cone so that the discharge through the nozzle is deposited in the shape of a ring of oil on the surface of the cylinder, preferably in or near the middle of same, and so timed that the discharge takes place when the piston is in or near the dead point opposite the nozzle. The latter condition prevents the deposition of oil on the piston head, which would be wasted.

A further object of my invention is the providing a means of discharging a small quantity of fluid under high pressure upon a working surface at a desired location.

A further object of my invention is the providing of means of discharging a definite quantity of fluid on a working surface determined as a function of the working of said surface.

A further object of my invention is the providing of means of discharging a definite quantity of fluid on a working surface and means for regulating said quantity both as to the amount discharged and frequency of discharge.

With the foregoing and other objects in view, my invention consists of the methods employed, combination and arrangements of systems, apparatus and means as hereinafter specifically provided and illustrated in the accompanying drawings wherein is shown the preferred embodiment of my invention, but it is understood that changes, variations and modifications may be resorted to which come within the scope of the claims hereunto appended.

Figure 3:
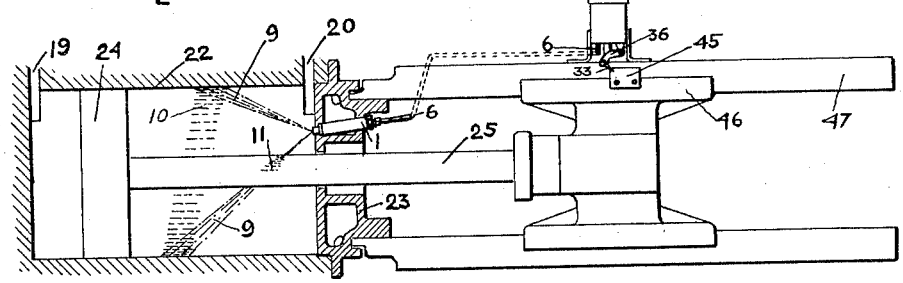
Figures 4, 5:
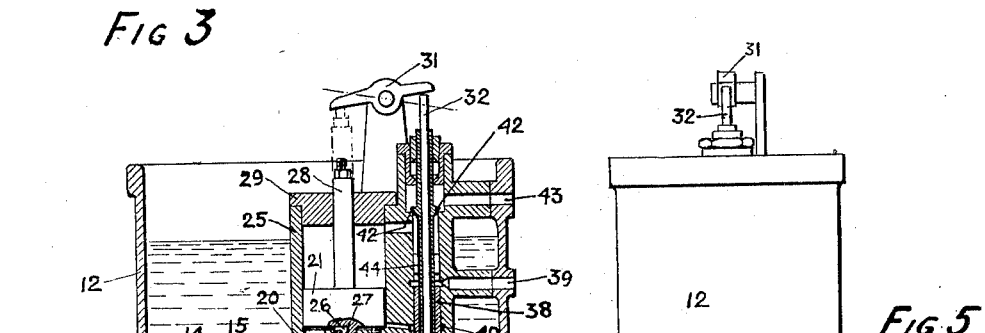

In the drawings of the herein-described embodiment of my invention, Fig. 1 shows a view in section of a spraying means for spraying the interior walls of a cylinder and piston rod. Fig. 2 shows a view of the spraying nozzle taken through 2—2 of Fig. 1, and shows the tangential holes 4 which causes the whirling spray action. Fig. 3 shows the nozzle in position in a cylinder head in operation spraying the walls of the cylinder and piston rod. Fig. 4 shows my improved means of feeding the lubricant to the nozzle shown in Fig. 1. Fig. 5 is a view showing a side elevation of Fig. 4, also detail of the operating mechanism driving the mechanism shown in Fig. 4.

Similar numerals refer to similar parts throughout the several views.

1 is a nozzle body which may be screwed into the head of the cylinder, as shown in Fig. 3; 2 is the nozzle which is screwed into nozzle body 1; 3 is the spray valve provided with a hollow stem in communication with the interior of nozzle body 1 and seats on nozzle 2, the valve seat formed in nozzle 2 being of conical shape and the valve 3 being provided with a conical surface of a larger body angle, these two conical surfaces forming a chamber 7 when valve 3 is closed.

Valve 3 near the base of its conical surface is supplied with substantially tangential holes 4 which permit the fluid to pass from the hollow valve stem into chamber 7, and when the valve is unseated and fluid is passing through said holes a whirling motion is engendered. 5 is a spring tending to keep valves 3 seated and is held by means of hole 5' in position on hollow valve stem. Hollow valve stem of valve 3 is externally threaded, or other means provided, to secure stop nuts 8 in an adjusted position to limit the movement of valves 3. 6 is a supply pipe secured in an ordinary way to nozzle body 1. 22 is a cylinder provided with cylinder head 23. In the drawing this is presumed to be a steam cylinder and provided with steam ports 19 and 20. I do not wish to limit myself, however, to the construction shown, as the invention is equally applicable to any working surface, such as, guides or exterior working parts, or other working cylinders, such as pumps, air or other compressors, internal combustion engines, or other interior working parts.

24 is a piston operated by piston rod 25. In cylinder head 23 is secured nozzle body 1 and when in operation supplies an intermittent cone of lubrication 9 forming a ring of lubricant 10 on the cylinder and lubricating the piston rod at 11.

Referring to Figs. 4 and 5, 12 is the reservoir for containing the lubricant or other fluid to be sprayed. Either in or in communication with this reservoir is measuring pump body 13 in which operates piston 14 and the attached plunger 15. 16 is a pump cylinder head in which is adjusing screw 16' to adjust and limit the movement of piston 14. 17 and 18 are ports admitting the operating fluid to the cylinder in which piston 14 operates, said ports being in direct communication with power cylinder ports 19 and 20 shown in Fig. 3, so that the pressure on the opposite sides of piston 24 operates pump piston 14, the said two pistons operating in timed relation.

In the case of a single acting engine when, for example, the port 17 is connected to port 19 and there is no port 20 to connect port 18 to, other means are used to return piston 14, such as a spring or compressed air attached to work on the other side of piston 14.

Pump plunger 15 sucks oil through valve 19 from the reservoir 12 and delivers through valve 20 to the feeding mechanism.

It is desirable to feed lubricant into the cylinders in a small quantity as may be needed at certain times as a function of the operation. The feeding mechanism consists of cylinder 25, in which works piston 21 to which is attached on the lower side feeding plunger 22, which plunger is hollow and formed at the top portion into a valve seat upon which seats valve 27, in this case a ball, which valve 27 is normally held in place by means of a spring which is omitted from the drawing for purposes of clearness. Valve 27 permits the passage of fluid from the underside of piston 21 into the feeding plunger through port 26 below the piston 21. On the upper side of piston 21 is piston rod 28 which extends neatly through cylinder head 29, which head 29 forms the head of cylinder 25.

On the head of piston rod 28 is an adjusting means consisting of a stud bolt screwed into piston rod 28 and locked in position by a lock nut; this enables the length of piston rod 28 to be adjusted for operating purposes. In feeding plunger 22 is by-pass 30 which in this case is a small hole and which operates when piston 21 is raised in cylinder 25 sufficient to bring said hole into said cylinder at which time and thereafter there is free communication between the lower part of said cylinder and the lower part of feeding plunger 22.

31 is a rocker arm which is operated by piston rod 28 as adjusted, and in turn operates trip rod 32, which rod in operation is pushed down and carries with it at its lower end pawl 33, which pawl is pivoted at 34 and is provided with a counter-weight or other means, spring, or the like, to maintain the same in disengaged position. 36 is a lever fulcrumed at 37 and at the end of which is pivot 34 carrying pawl 33 and operates the stem of piston valve 38 after the same has passed through a stuffing-box in the bottom of the reservoir. In construction lever 36 consists of a pair of levers straddling valve stem of valve 38 which is provided with a pin at its lower end, 50, and embraces pawl 33 between said pair.

38 is a sleeve valve at its upper end covering exhaust port 39 from the upper end of cylinder 25 and at the same time at the lower end of its valve portion uncovers overflow port 40 permitting free passage between the underside of piston 21 and reservoir 12. This valve 38 is maintained in a down or closed position by means of spring 48.

Within sleeve valve 38 is hollow stem 41 to which is attached valve 42 which valve controls the admission from high pressure source 43.

On hollow valve stem 41 are secured lugs 44 which are engaged by sleeve valve 38 after the same has closed exhaust port 39 and opened overflow port 40, thus raising said valve 42 admitting high pressure through 43 onto the upper side of piston 21 forcing the same down and thereby forcing the fluid under said piston through port 40 and the fluid in hollow plunger 22 through by-pass 30 into the reservoir until the by-pass 30 is below and cut off by the bottom of the cylinder 25, when the remainder of the stroke forces fluid by hollow plunger 22 into pipe 6, the amount being determined by the amount piston is allowed to descend after by-pass 30 is closed; this is adjusted by means of adjusting screw 44.

45 is a plate or operating means which engages pawl 33 and which is of sufficient length to maintain pawl 33 in up or operating position, as shown by dotted lines, after disengaging from tooth 49, a sufficient interval of time is thus given to permit the desired action of piston 21. This is necessary to sustain the pressure on piston 21 in order to insure the same reaching the end of its stroke. Plate 45 is attached to some moving part timed to discharge as desired; in the case shown it is attached to cross-head 46 to which the piston rod 25 is secured. 47 are cross-head guides; 48 is a spring tending to keep piston valve in down or closed position, and also keeps valve 42 seated. 49 is a tooth in which pawl 33 is engaged in a hit-and-miss manner.

The operation of my invention is as follows: Assuming the same is attached to a steam engine and cylinder oil is to be fed reservoir 12 is filled with lubricant, stop nuts 8 are adjusted to give the proper spray. This is a fine adjustment of perhaps a few thousandths of an inch. The adjusting screw 44 is adjusted so that a proper amount of lubricant is delivered at each discharge, depending on the size of the engine and the work in hand. The adjustment of piston rod 28 determines the frequency of discharge with relation to the motion of the engine.

Piston 14 operating in timed relation with piston 24, by means of plunger 15, pumps the lubricant to the under side of piston 21, raising the same against its own weight, and the back pressure of exhaust through 39, which is substantially nothing when open to the air. After a number of strokes of plunger 15, piston rod 28 is sufficiently elevated to engage rocker arm 31; at this time the under side of piston 21, hollow feeding plunger 22, pipe 6, and chamber 7 are filled with lubricant through valve 27, but not under pressure other than explained above, namely, the weight of the piston, the exhaust being open to the atmosphere. As rocker arm 31 operates pushing down trip rod 32, thereby pushing down pawl 33, a point is reached when pawl 33 engages with plate 45 on the cross-head; this causes the feeding apparatus to function by instantly raising the valve 38 which opens the port 40, allowing the superfluous lubricant on the under side of piston 21 to flow back into the reservoir, closes exhaust 39, this preventing the escape of high pressure fluid, and opens valve 42 which admits high pressure fluid, through passage 43 which pushes piston 21 down until it engages with adjusting means 44. The entrapped lubricant, after by-pass 30 passes the lower end of the cylinder, is forced through pipe 6 into chamber 7, raising valve 3 and forming a revolving discharge under high pressure as desired.

In this specification, when I use the term "spray", I mean the discharging of a lubricant, or other fluid, from a discharge location through space on to the surface to be lubricated; and further, in this specification when I use the term "cylinder", I mean any enclosed surface that it may be desired to lubricate or place a fluid thereon, and includes piston rods, cylinders, or other operating surfaces. And further in this specification, when I use the term "fluid", I mean any elastic, or inelastic, fluid, such as, steam, air, gases, oil, water or other liquids, as my invention is applicable to steam engines, water pumps, gas engines, air pumps, etc.

Having thus described my invention, what I claim and desire to secure by Letters Patent is:

1. Means for cylinder lubrication consisting of, an orifice in the end portion of a cylinder, in combination with means for forcing a lubricant through said orifice at predetermined intervals for spraying the working surfaces within said cylinders, and means for controlling the period of said intervals.

2. Means of introducing a lubricant into a cylinder consisting of, a nozzle permanently located with reference to the surface of the cylinder and positioned to discharge thereon in combination with, means of supplying said nozzle with a definite amount of lubricant delivered in timed relation with a moving part operating in said cylinder, and a moving part controlling said function.

3. A lubricating fluid operated means for feeding a cylinder, consisting of, a lubricant supply, a pumping means supplied from said supply and discharging into the feeding means, said pumping means being operated by a piston each side of which is in communication with the cylinder to be lubricated, and a feeding means for feeding said lubricant into said cylinder.

4. Means of forcing a lubricant into a cylinder consisting of, a nozzle, permanently positioned within said cylinder, a pump feeding a lubricant into a feeding means, a feeding means, and means of regulating said feeding means to feed a desired amount of lubricant per cycle of operation of the lubricator through said nozzle.

5. In a lubricating means, a feeding means consisting of, a piston actuating a lubricating pump one side of said piston and the cylinder in which it works forming a power mechanism when controlled by a fluid, means for controlling said fluid, the other side of said piston and the cylinder in which it works and the attached plunger forming a lubricating pump, positive means for introducing lubricant into said pump, and means for controlling the discharge from said pump as to quantity per each discharge.

6. In a lubricating means, a feeding means consisting of, a piston actuating a lubricating pump one side of said piston and the cylinder in which it works forming a power mechanism when controlled by a fluid, means for controlling said fluid, the other side of said piston and the cylinder in which it works and the attached plunger forming a lubricating pump, positive means for introducing lubricant into said pump, and means for controlling the discharge from said pump as to frequency of the same.

7. In a lubricating means, means for positively ejecting lubricant therefrom, and means for controlling said ejection as to time of discharge consisting of co-ordinated parts one of which operates in timed relation with the part to be lubricated and the other controlling said feeding means.

8. A spray-nozzle for feeding lubricant consisting of, a body provided with a valve seat, a valve seating on said valve seat, said valve and seat being exposed to the surface to be lubricated and formed so as to discharge a hollow spray of lubricant thereon, means for discharging fluid within said body through said valve, means for normally maintaining said valve seated and means for securing said nozzle to a body to be lubricated.

9. A spray-nozzle for feeding lubricant consisting of, a body provided with a valve seat, a valve seating on said valve seat, said valve and seat being exposed to the surface to be lubricated and formed so as to discharge a hollow spray of lubricant thereon, means for discharging fluid within said body through said valve, means for normally maintaining said valve seated, and means for securing said nozzle to a body to be lubricated, in combination with means for supplying lubricant to be fed, and means for controlling said supply as to amount of feeding and time of feeding and positive means of feeding.

10. A lubricating pump for feeding a cylinder, fluid operated, consisting of, a lubricant supply, a pump supplied from said supply and discharging into the feeding means, said pump being operated by a piston one side of which is in communication with the cylinder to be lubricated, means for operating said piston and a feeding means for feeding said lubricant into said cylinder from a relatively stationary discharge.

11. Means of introducing a lubricant into a cylinder consisting of, a nozzle permanently located in the head of said cylinder in combination with, means of supplying said nozzle with lubricant and discharging the same as desired consisting of a timing means regulating the number of revolutions of engine per each discharge of the lubricant.

12. A spray nozzle for feeding lubricant consisting of, a body provided with a valve seat, a valve seating on said valve seat, means for discharging fluid within said body through said valve, means for rotating the fluid so passed, and means for securing said nozzle to a body to be lubricated.

13. A lubricating means comprising a feeding means, a discharge means, and means for co-ordinating the timed relation of the lubricating discharge with relation to the position of the moving body passing over the surface lubricated.

14. A lubricating device consisting of a measuring device feeding a discharge device, means for discharging the superfluous lubricant from the discharge device not required for lubrication, and means for discharging a definite amount of lubricant from said discharge device on to the surface to be lubricated in combination with means for operating the various parts in timed relation with the parts to be lubricated.

15. A device for cylinder lubrication consisting of, means for spraying within the working chamber the surface of the cylinder with a hollow cone of lubricant from a pre-determined fixed point with reference to said cylinder intermittently at pre-determined intervals, means controlling said fixed interval and a fixed orifice in the end of said cylinder from which said lubricant is sprayed.

16. A device for cylinder lubrication consisting of, means for spraying within the working chamber the surface of the cylinder with a hollow cone of lubricant from a pre-determined fixed point with reference to said cylinder intermittently at pre-determined intervals and means for changing said pre-determined intervals.

17. A lubricating means for feeding lubricant to a cylinder fluid operated consisting of, a lubricant supply, a pumping means supplied from said supply and discharging into a feeding means, said pumping means being operated by a piston one side of which is in communication with the cylinder to be lubricated operating said piston in one direction, means for operating said piston in the reverse direction, and a feeding means for feeding said lubricant into said cylinder.

18. Means for cylinder lubrication with an internal spray of lubricant consisting of, a fixed orifice with reference to said cylinder whereby the spray is formed at the said orifice with substantially a hollow cone to lubricate the wall of said cylinder, and means in said orifice to form said lubricant into said hollow cone.

LEON WYGODSKY.